United States Patent

Jacobs

Patent Number: 6,006,481
Date of Patent: Dec. 28, 1999

[54] INSULATION SHEET HAVING AN INTEGRAL TAPE STRIP AND METHOD OF USING SAME

[76] Inventor: Vance G. Jacobs, 869 Burr Rd., Wauseon, Ohio 43567

[21] Appl. No.: 09/022,911

[22] Filed: Feb. 12, 1998

[51] Int. Cl.⁶ ........................................ E04C 2/20
[52] U.S. Cl. ................ 52/309.9; 52/404.1; 52/404.4; 52/416; 52/DIG. 16
[58] Field of Search ................. 52/DIG. 16, 416, 52/309.9, 404.1, 404.4, 745.19, 746.11, 748.1

[56] References Cited

U.S. PATENT DOCUMENTS

| | | | |
|---|---|---|---|
| 3,111,787 | 11/1963 | Chamberlain | 52/DIG. 16 X |
| 3,121,649 | 2/1964 | Oliver | 52/DIG. 16 X |
| 3,468,086 | 9/1969 | Warner | 52/DIG. 16 X |
| 3,816,199 | 6/1974 | Dawdy et al. | 52/DIG. 16 X |
| 5,316,835 | 5/1994 | Groft et al. | |

*Primary Examiner*—Christopher Kent
*Attorney, Agent, or Firm*—MacMillan Sobanski & Todd, LLC

[57] ABSTRACT

An insulation sheet having first and second layers of facing; and a sheet of foam material laminated between the first and second layers of facing. A portion of the first layer of facing extends beyond an edge of the sheet of foam material to form a strip. The strip has an adhesive applied on one side of the strip.

15 Claims, 2 Drawing Sheets

6,006,481

INSULATION SHEET HAVING AN INTEGRAL TAPE STRIP AND METHOD OF USING SAME

BACKGROUND OF THE INVENTION

This invention relates in general to an improved insulation product for use in building structures. Buildings, such as residential or commercial structures, typically include insulation material placed adjacent the interior surfaces of the roof and the exterior walls to thermally insulate the building from outside temperatures. Many different types of insulation products can be used, such as for example, blankets of fiberglass or loose fill insulation. Insulation sheets having a layer of foam material, such as expanded polystyrene or polyurethane, may also be used for insulation purposes.

The insulation foam sheets can be supplied as pre-cut rectangular rigid panels or in lengths of flexible rolls. Layers of metallic foil may be provided on the outer surfaces of the insulation foam sheets to reduce radiant heat transfer. Metallic foil may be provided on one or both major sides of the insulation sheets. Additionally, the foil sheets can be laminated with polymer films to provide strength from tearing and puncturing. Another strengthening feature is to laminate scrim or strands of webbing between the polymer film and the metallic foil layer.

To install rigid insulation foam panels, a worker holds the panels against the structural beams of the wall or the roof, and then fastens the panel to the structural beams, such as by self-tapping screws or nails. The next panel is then placed adjacent the previously attached panel and fastened in the same manner until the wall or roof is complete. Since the panels can be relatively large, it is often cumbersome for one worker to hold the panel in the proper position against the beams while driving a fastener through the panel to secure the panel to the structural beam. If the panels are installed on a roof, it is especially difficult since the worker generally holds the panel up above them. The seamns between the adjacent panels are then commonly covered with adhesive tape, such as reflective faced tape if the panels have an outer metallic foil layer. The tape helps to close or seal any gaps formed between adjacent panels.

BRIEF SUMMARY OF THE INVENTION

This invention relates in general to an improved insulation sheet for use in building structures and a method of manufacturing and using the same. The insulation sheet of the present invention includes first and second layers of facing, and a sheet of foam material which is laminated between the first and second layers of facing. A portion of the first layer of facing extends beyond an edge of the sheet of foam material to form a strip. The strip has an adhesive applied on one side of the strip. Preferably, a removable backing strip is applied over the adhesive on the strip to substantially cover the adhesive. The insulation sheet can optionally include a second strip which is formed from a portion of the second layer of facing which extends beyond the edge of the sheet adjacent the first strip.

In a specific embodiment of the invention, the first layer of facing includes a sheet of polyethylene, a polymer film, and a layer of intermeshed strands laminated between the sheet of polyethylene and the polymer film. In another specific embodiment of the invention, the second layer of facing includes a sheet of metallic foil, a polymer film, and a layer of intermeshed strands laminated between the sheet of metallic foil and the polymer film.

The method of manufacturing an insulation sheet, in accordance with the present invention, includes first providing a first layer of facing. The first layer of facing in laminated on a first side of a sheet of foam material such that a portion of the first layer of facing extends beyond an edge of the sheet of foam material to form a strip. A second layer of facing is laminated to a second side of the sheet of foam material opposite the first side. An adhesive is applied to one side of the strip. Optionally, a removable backing strip can be applied on top of the adhesive applied to the strip so that the backing strip substantially covers the adhesive.

The method of installing the insulation sheet on a roof structure having a plurality of structural beams, in accordance with the present invention, includes providing insulation sheets having first and second layers of facing and a sheet of foam material laminated between the first and second layers of facing such that a portion of the first layer of facing extends beyond an edge of the sheet of foam material to form a strip. The strip has an adhesive applied on one side of the strip and is covered by a removable backing strip. A first insulation sheet is first fastened to a structural beam of the roof structure. An edge of a second insulation sheet is positioned adjacent the edge of the first insulation sheet having the strip. The backing strip is peeled from the strip of the first insulation sheet to expose the adhesive. The strip of the first insulation sheet is affixed to a surface of the second insulation sheet which is adjacent the edge of the second insulation sheet. The second insulation sheet is then fastened to a structural beam of the roof structure.

Various objects and advantages of this invention will become apparent to those skilled in the art from the following detailed description of the preferred embodiment, when read in light of the accompanying drawings.

DETAILED DESCRIPTION OF THE INVENTION

Figure 1:
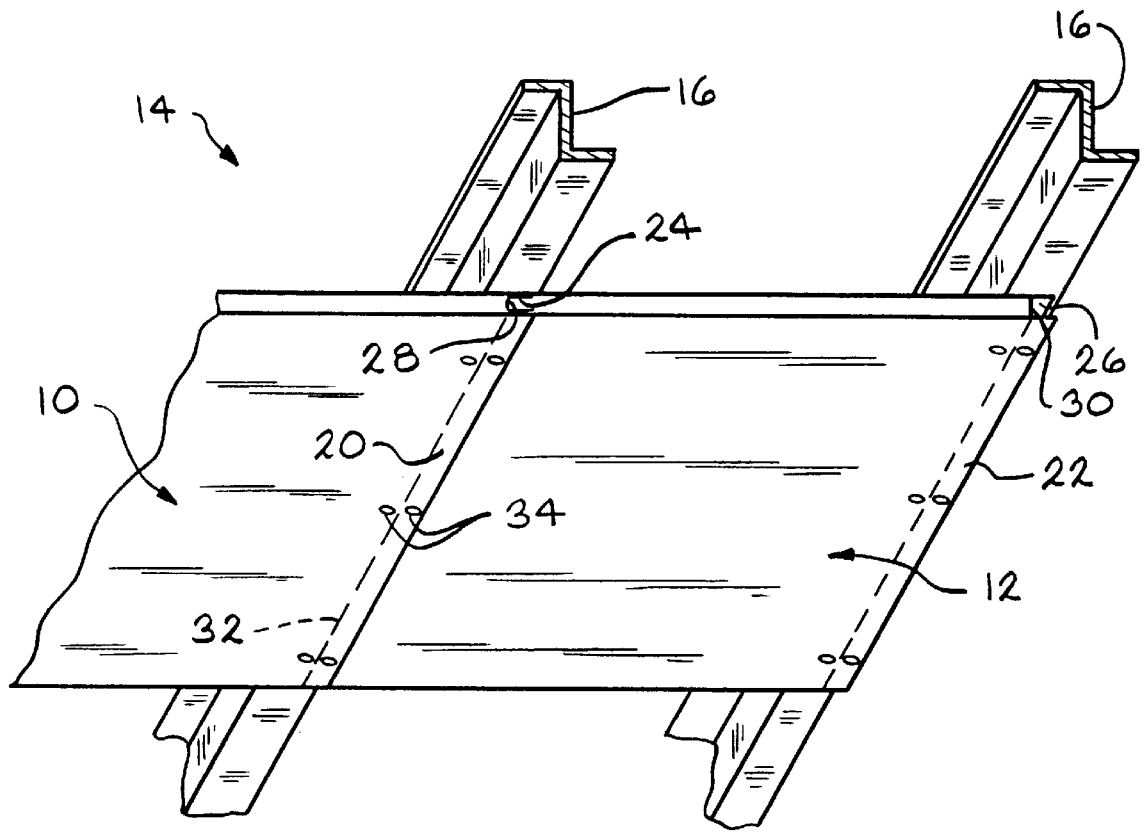
FIG. 1 is a perspective view of a roof structure having insulation sheets, in accordance with the present invention, installed thereon.

Referring now to the drawings, there is illustrated in FIG. 1, rectangular first and second insulation sheets or panels, indicated generally at 10 and 12, respectively, in accordance with the present invention. The insulation panels 10 and 12 are made of the same materials and are essentially identical in structure. A plurality of insulation panels 10 and 12 are suitable for use as thermal insulation for walls or roofs of building structures when positioned adjacent one another to cover a desired area of the wall or roof. For example, as illustrated in FIG. 1, the insulation panels 10 and 12 are fastened to a roof structure, indicated generally at 14. The roof structure 14 includes a plurality of parallel spaced structural beams 16. Although the beams 16 are represented as purlins having a Z-shaped cross-section, it should be understood that the insulation panels 10 and 12 can be used with and fastened to any suitable structure.

As will be described in detail below, each insulation panel 10 and 12 has a tape strip 20 and 22, respectively, extending from edges 28 and 30 thereof. Preferably, the insulation panels 10 and 12 also have an overlap strip 24 and 26, respectively, which extend from the edges 28 and 30, respectively. The insulation panels 10 and 12 can be connected together by placing the tape strip 20 and the overlap strip 24 of the insulation panel 10 on the respective surface of the insulation panel 12 adjacent an edge 32 opposite the edge 30. The insulation panels 10 and 12 are oriented so that the edge 32 of the insulation panel 12 is positioned adjacent the edge 28 of the insulation panel 10. The insulation panels 10 and 12 can be connected to the beams 16 by a plurality of fasteners 34, such as self-tapping screws or nails, extending through the insulation panels 10 and 12 into the beams 16. A row of insulation panels 10 and 12 can be connected together in a similar manner.

Figure 2:
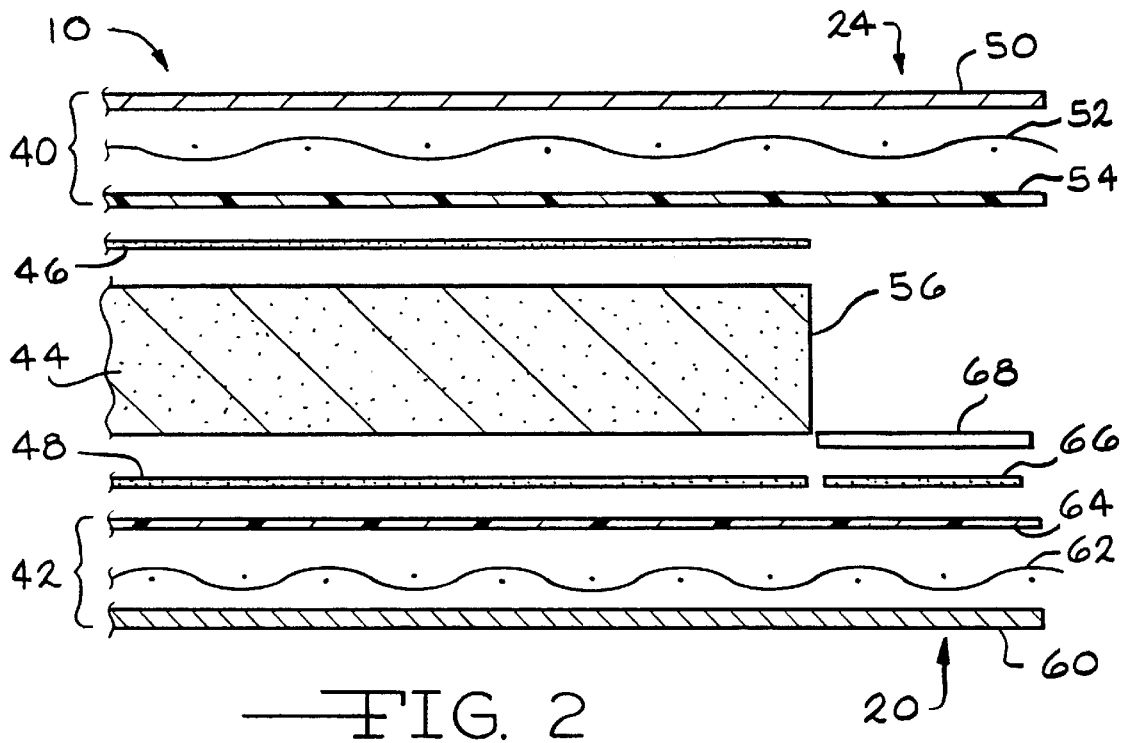
FIG. 2 is a separated sectional view of one of the ends of the insulation sheet illustrated in FIG. 1, wherein the components are enlarged for clarity.

Since the insulation panels 10 and 12 are identical, just the insulation panel 10 will be described in detail. As shown in FIG. 2, the insulation panel 10 is a multi-layer panel. The insulation panel 10 generally includes a first or inner layer of facing 40, a second or outer layer of facing 42, and an intermediate sheet of foam material 44 between the inner and outer layers of lo facing 40 and 42. The sheet of foam material 44 can be laminated between the inner and outer layers of facing 40 and 42 by any suitable means, such as by a layer of adhesive or hot melt 46 and 48, respectively. The inner layer of facing 40 faces the wall or roof of the building in which the insulation panel is installed, while the outer layer of facing 42 faces the interior of the building.

The sheet of foam material 44 is preferably rigid and can be made of any suitable foam material having high thermal insulating properties, such as expanded polystyrene, polyurethane, styrene, or any suitable polyolefin. The thickness of the sheet of foam material 44 can be any suitable size for typical building insulation applications, such as within the range of from about 0.125 inches to about 3 inches.

Preferably, the inner layer of facing 40 includes a layer of metallic foil 50, a scrim layer 52, and a relatively thin layer of a polymer film 54 which is melted to laminate the layers of the inner layer of facing 40 together. The metallic foil 50 is provided to reduce the radiant heat transfer from the wall or roof structure. The thickness of the metallic foil is preferably within the range of from about 0.002 inches to about 0.004 inches, and more preferably within the range of from about 0.000285 inches to about 0.0003 inches. The scrim layer 52 is a lattice or webbing of a multiplicity of intermeshed or interwoven strands of material which provides tensile strength to the insulation panel. Preferably, the strands of the scrim layer 52 are made of a polymeric or polyolefin material, such as polyethylene or polypropylene. Besides performing as the laminate for the inner layer of facing 40, the polymer film 54 provides strength to the inner layer of facing 40 from tearing and puncturing. Preferably, the polymer film is made of polyethylene and has a thickness within the range of from about 0.00025 inches to about 0.001 inches.

Note that the edge 28 of the insulation panel 10 is generally defined by an edge 56 of the sheet of foam material 44, as illustrated in FIG. 2. The inner layer of facing 40 extends past the edge 56 to form the overlap strip 24.

Preferably, the outer layer of facing 42 includes a sheet of polymer 60, a scrim layer 62, and a relatively thin layer of a polymer film 64 which is melted to laminate the layers of the outer layer of facing 42 together. The sheet of polymer 60 is preferably made of polyethylene mixed with a suitable fire retardant additive. The sheet of polymer 60 can also be white in color for aesthetic purposes. If desired, the outer layer of facing 42 could be made with a metallic foil layer instead of the sheet of polymer 60, thus being the same as the inner layer of facing 40. The thickness of the sheet of polymer 60 is preferably within the range of from about 0.001 inches to about 0.0015 inches. The scrim layer 62 is similar to the scrim layer 52 and is preferably made of strands of polyethylene or polypropylene. The polymer film 64 is similar to the polymer film 54 and is preferably made of polyethylene.

The outer layer of facing 42 extends past the edge 56 of the sheet of foam material to form the tape strip 20. The tape strip 20 has an adhesive 66 applied thereon. The adhesive 66 is covered with a removable backing strip 68 which substantially covers the adhesive 66. The backing strip 66 preferably has a silicon coating applied thereto so that the backing strip can be easily removed. The adhesive 66 can be the same adhesive as the adhesive 48 which is applied together across the outer layer of facing 42. Alternatively, the adhesive 66 can be separate from the adhesive 48, such as a strip of tape having adhesive applied to both sides thereof. The adhesive 66 can be any suitable adhesive which will adhere the tape strip 20 to the surface of an adjacent insulation panel when the insulation panels are installed, as will be explain in detail below.

For ease of manufacturing, the inner and outer layers of facing 40 and 42 can be laminated individually and then each laminated to the sheet of foam material 44 to, thereby forming the insulation panel 10. Of course, the individual layers of the insulation panel 10 can be assembled in any suitable manner. If desired, the outer layer of facing 42 could be first manufactured identically to the inner layer of facing 40 and then later having a sheet of polymer 60 added on top of the metallic foil 50.

The insulation panels of the present invention can be easily installed by a single person. Referring again to FIG. 1, to install the insulation panels 10 and 12, a worker first fastens the insulation panel 10 to the beams 16 by use of the fasteners 34. Another insulation panel, such as the insulation panel 12, is then placed adjacent the insulation panel 10 so that the edge 32 of the insulation panel 12 abuts the edge 28 of the insulation panel 10. The overlap strip 24 of the insulation panel 10 is positioned or against the surface of the inner layer of facing of the insulation panel 12 so that the overlap strip 24 covers any gap between the two insulation panels 10 and 12. This can easily be accomplished by one hand of the worker since the insulation panels are relatively lightweight. The worker then removes the backing strip 68 from the insulation panel 10 with the other hand and the tape strip 20 is affixed to the surface of the outer layer of facing of the insulation panel 12. Thus, one end of the insulation panel 12 is supported by the tape strip 20 of the insulation panel 10. The worker then fastens the insulation panel 12 to the beams 16 by the fasteners 34. Since the edge 32 of the insulation panel 12 is supported by the tape strip 20, the worker can easily operate a fastening tool with a free hand without having to support and maintain the position of the insulation 12 prior to fastening to the beams 16.

Other insulation panels are then installed in a systematic manner as described above. The seams between edges of adjacent insulation panels not having the tape and overlap strip thereon, e.g., the upper and lower edges as shown in FIG. 1, can then be taped together with a separate roll of tape to effectively cover any gap between the insulation panels. If desired, the tape can be reflective tape to reduce radiant heat transfer.

Figure 3:
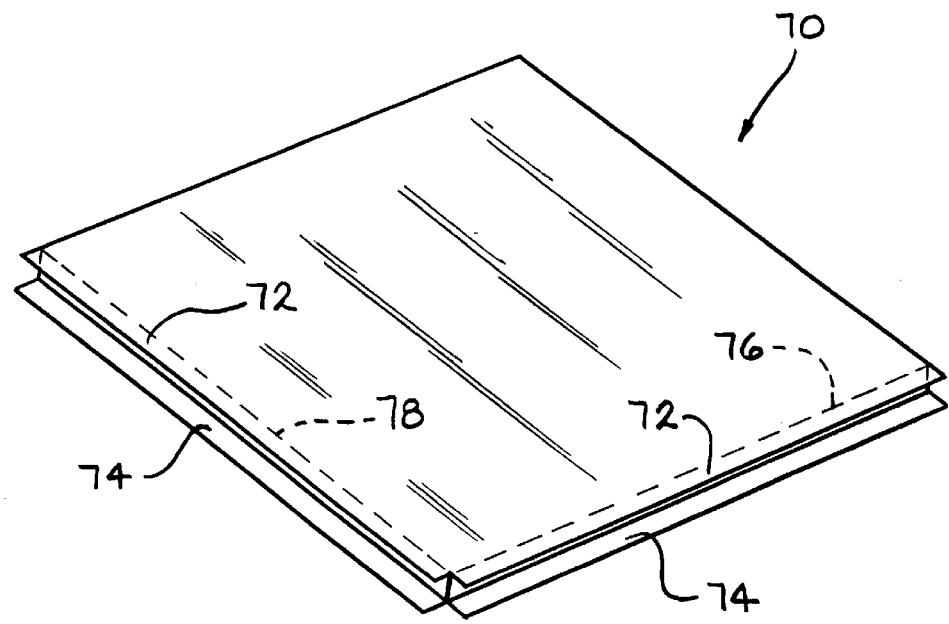
FIG. 3 is a perspective view of a second alternate embodiment of an insulation sheet, in accordance with the present invention.

There is illustrated in FIG. 3, a second embodiment of an insulation panel, indicated generally at 70. The insulation panel 70 has two pairs of tape strips 72 and overlap strips 74 positioned on adjacent edges 76 and 78, respectively. The pairs of strips provide for coverage on generally all of the seams between the insulation panels 70 when installed adjacent one another in a tile-like pattern.

Figure 4:
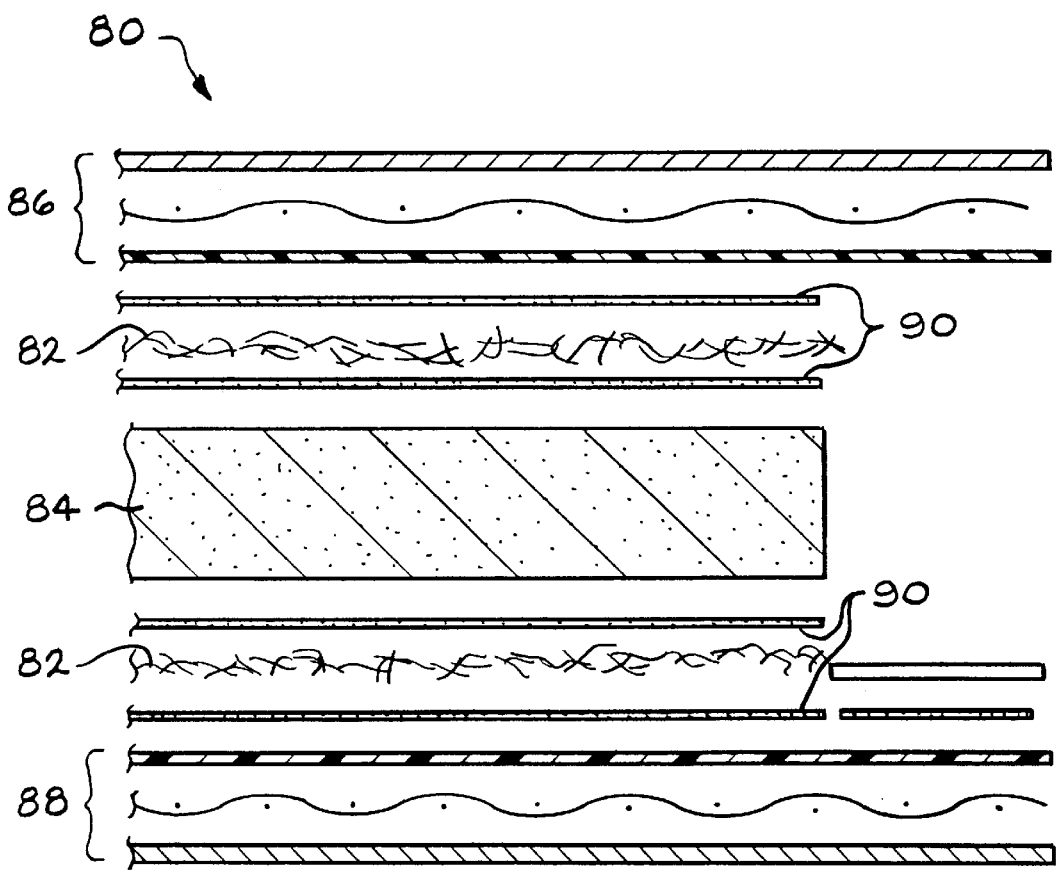
FIG. 4 is an exploded separated sectional view of an end of a third embodiment of an insulation sheet, in accordance with the present invention.

There is illustrated in FIG. 4, a third embodiment of an insulation panel, indicated generally at 80. The insulation panel 80 is similar to the insulation panel 10 of FIG. 2, with the addition of fibrous layers 82, such as fiberglass, laminated between a sheet of foam material 84 and inner and outer layers of facing 86 and 88. The fibrous layer 82 can be laminated by the use of adhesive layers 90. The insulation panel 80 can have a single fibrous layer or two fibrous layers, such as that shown in FIG. 4. The fibrous layer 82 helps provide increased fire resistance for the insulation panel 80.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An insulation sheet comprising:

first and second layers of facing; and a sheet of foam material laminated between said first and second layers of facing, said first layer of facing having a first portion extending beyond a first edge of said sheet of foam material to form a first strip, said second layer of facing having a second portion extending beyond a second edge of said sheet of foam material to form a second strip.

2. The insulation sheet of claim 1, wherein said first and second edges are the same edge of said sheet of foam material such that said first and second strips are adjacent one another.

3. The insulation sheet of claim 2, wherein said first layer of facing includes a third portion extending beyond a third edge of said sheet of foam material to form a third strip, and wherein said second layer of facing includes a fourth portion extending beyond said third edge of said sheet of foam material to form a fourth strip.

4. The insulation sheet of claim 1, wherein said first strip has an adhesive applied on one side of said first strip, said insulation sheet further including a removable backing strip substantially covering said adhesive applied to said first strip.

5. The insulation sheet of claim 1, wherein said first and second layers of facing each include:

an outer sheet;

a polymer film; and a layer of intermeshed strands laminated between said outer sheet and said polymer film.

6. The insulation sheet of claim 5, wherein said outer sheet is made of polyethylene.

7. The insulation sheet of claim 5, wherein said outer sheet is a sheet of metallic foil.

8. An insulation sheet comprising:

first and second layers of facing, said first and second layers of facing each including:

an outer sheet;

a polymer film; and a layer of intermeshed strands laminated between said outer sheet and said polymer film;

a sheet of foam material laminated between said first and second layers of facing, said first layer of facing having a first portion extending beyond a first edge of said sheet of foam material to form a first strip, said second layer of facing having a second portion extending beyond a second edge of said sheet of foam material to form a second strip;

an adhesive applied on one side of said first strip; and a removable backing strip substantially covering said adhesive applied to said first strip.

9. The insulation sheet of claim 8, wherein one of said outer sheets is made of polyethylene.

10. The insulation sheet of claim 8, wherein one of said outer sheets is a sheet of metallic foil.

11. An insulation sheet comprising:

first and second layers of facing; and a sheet of foam material laminated between said first and second layers of facing; and a non-woven fibrous layer laminated between said sheet of foam material and said first layer of facing.

12. The insulation sheet of claim 11 further including a second fibrous layer laminated between said sheet of foam material and said second layer of facing.

13. The insulation sheet of claim 11, wherein said first layer of facing has a first portion extending beyond a first edge of said sheet of foam material to form a first strip, said first strip having an adhesive layer applied on one side of said first strip, said insulation sheet further including a removable backing strip substantially covering said adhesive applied to said first strip.

14. The insulation sheet of claim 13, wherein said second layer of facing has a second portion extending beyond a second edge of said sheet of foam material to form a second strip.

15. The insulation sheet of claim 11, wherein the sheet of foam material is a rigid board.

\* \* \* \* \*